(12) United States Patent
Takemura et al.

(10) Patent No.: US 7,416,346 B2
(45) Date of Patent: Aug. 26, 2008

(54) CYLINDRICAL ROLLER BEARING

(75) Inventors: Hiromichi Takemura, Kanagawa (JP); Masanao Sato, Kanagawa (JP)

(73) Assignee: NSK Ltd., Tokyo (JP)

( * ) Notice: Subject to any disclaimer, the term of this patent is extended or adjusted under 35 U.S.C. 154(b) by 208 days.

(21) Appl. No.: 10/560,283

(22) PCT Filed: May 18, 2004

(86) PCT No.: PCT/JP2004/007044

§ 371 (c)(1), (2), (4) Date: Dec. 12, 2005

(87) PCT Pub. No.: WO2004/111477

PCT Pub. Date: Dec. 23, 2004

(65) Prior Publication Data

US 2006/0126983 A1 Jun. 15, 2006

(30) Foreign Application Priority Data

Jun. 12, 2003 (JP) .............................. 2003-168107
Aug. 11, 2003 (JP) .............................. 2003-291258

(51) Int. Cl.
*F16C 33/58* (2006.01)
*F16C 19/00* (2006.01)

(52) U.S. Cl. .................. 384/564; 384/450; 384/571; 384/568

(58) Field of Classification Search .................. 384/450, 384/462, 548, 556, 564–565, 568–569, 571
See application file for complete search history.

(56) References Cited

U.S. PATENT DOCUMENTS

| 4,027,930 | A  | * | 6/1977  | Bodensieck       | 384/564 |
| 6,086,261 | A  | * | 7/2000  | Nakagawa et al.  | 384/571 |
| 6,086,262 | A  | * | 7/2000  | Matsumoto        | 384/571 |
| 6,530,693 | B1 | * | 3/2003  | Ijuin et al.     | 384/450 |
| 6,702,471 | B2 | * | 3/2004  | Sakoda et al.    | 384/564 |
| 6,767,134 | B2 | * | 7/2004  | Murai et al.     | 384/568 |
| 7,150,565 | B1 | * | 12/2006 | Koyama et al.    | 384/450 |

FOREIGN PATENT DOCUMENTS

| EP | 1347185 A2 | * | 9/2003 |
| JP | 51-156346 A |   | 12/1976 |
| JP | 58-043609 A | * | 9/1983 |

(Continued)

*Primary Examiner*—Marcus Charles
(74) *Attorney, Agent, or Firm*—Sughrue Mion, PLLC

(57) ABSTRACT

A cylindrical roller bearing includes an inner ring having a flange portion provided with a roller guide-surface which guides the end faces $4a$ of the cylindrical rollers having diameter of Da. The end face $4a$ away from a center axis of the cylindrical roller by 0.40 Da in the radial direction is a first position A, and the end face $4a$ away from the center axis by 0.35 Da is a second position B, the end face $4a$ contacts with the roller guide-surface between the first and second positions A and B, the end face $4a$ has a convex-shaped crowning portion $4b$ having a continuous curve which passes the first and second positions A and B, and an angle $\alpha$ formed between a line connecting the first and second positions A and B and a line perpendicular to the center axis is set to be 0.5° or less.

8 Claims, 7 Drawing Sheets

FOREIGN PATENT DOCUMENTS

| | | |
|---|---|---|
| JP | 59-106719 A | 6/1984 |
| JP | 6-241235 A | 8/1994 |
| JP | 07-12119 A * | 1/1995 |
| JP | 7-42746 A | 2/1995 |
| JP | 7-91452 A | 4/1995 |
| JP | 9-229057 A | 9/1997 |
| JP | 9-236131 A | 9/1997 |
| JP | 10-196660 A | 7/1998 |
| JP | 2002-181053 A | 6/2002 |

* cited by examiner

CYLINDRICAL ROLLER BEARING

TECHNICAL FIELD

The present invention relates to a cylindrical roller bearing which is used for the transmission etc. of an automobile and durable of an excessive axial load applied thereto, and in particular relates to the improvement of a cylindrical roller bearing which seizure resistance is improved so as not to cause the seizure immediately even in a case of a high-speed rotation or a case of using low-viscosity oil or a case where a lubricating oil device is failed and lubricating oil can not be supplied sufficiently.

BACKGROUND ART

In general, a cylindrical roller bearing is configured in a manner that, in order to guide cylindrical rollers in the circumferential direction of a raceway ring, a flange portion is provided at the end portion of the raceway ring, and the end face of each of the rollers is made in slide contact with a roller guide-surface formed at the inner surface of the flange portion. A cylindrical roller bearing used for the transmission etc. of an automobile may be used in a state of being applied with an axial load in addition to a radial load. When the cylindrical roller bearing rotates while being applied with the axial load, a local stress such as an edge load acts on a portion where the end face of the cylindrical roller contacts with the roller guide-surface of the flange portion thereby to generate a large friction at the contact surface. When the friction becomes remarkable due to the high speed rotation, wear and seizure are caused and so there may arise a case that the bearing is broken in an early stage.

Thus, in order to make a contact surface pressure between the end face of the roller and the roller guide-surface of the flange portion as uniform as possible, the end face of the roller or the roller guide-surface of the flange portion is slightly tapered or crowned so as not to cause a large edge load.

As a technique of preventing or reducing the seizure of a cylindrical roller bearing, there is a technique of improving the surface roughness of the contact surfaces of the roller and the flange portion. There is another technique in which a crowing is provided at the end face of the roller so as to contact with the end face of the roller at the center position of the height of the flange thereby to prevent the contact point of an elliptical shape from falling into a relief groove or protruding largely to the outside of the flange height, for example.

As a conventional technique, there is known a roller bearing in which the surface roughness of the end face of a roller and the flange portion to be contacted to each other is improved thereby to prevent the lubrication failure (see Japanese Patent Unexamined Publication No. JP-A-7-42746, for example). Further, there is known another roller bearing in which a working grain is provided in a direction almost perpendicular to the relative movement direction in order to improve the lubrication efficiency (see Japanese Patent Unexamined Publication No. JP-A-7-91452, for example). Furthermore, there is known still another roller bearing in which minute recess portions are provided at the contact region of a flange portion contacting with the end face of a roller thereby to intend to maintain the forming of an oil film (see Japanese Patent Unexamined Publication No. JP-A-6-241235, for example). Furthermore, there is known still another roller bearing in which, in order to reduce an amount of heat generated by the sliding operation, the shape of a roller is changed so that the position where the roller contacts with a flange portion is made same as the outer diameter surface of the roller (see Japanese Patent Unexamined Publication No. JP-A-9-236131, for example).

Furthermore, there is proposed a technique in which oil films are surely formed within a roller and a flange surface at the rolling contact portion thereby to prevent or reduce seizure by placing the intersection position of the chamfering portion and the plane portion of the roller end face on the radial-direction small diameter side in an outer ring flange portion and the radial-direction large diameter side in an inner ring flange portion, rather than the intersection point of the flange surface and a relief portion for grinding (see Japanese Patent Unexamined Publication No. JP-A-2002-181053, for example).

However, the improvement of the surface roughness and the provision of the working grain as respectively disclosed in the JP-A-7-42746 and JP-A-7-91452 cause a problem of the cost-up and a problem in the stability of quality due to the particular processing equipment and the extension of the processing time. On the other hand, even in the case where the roller and the flange portion are changed in the particular shapes as disclosed in JP-A-6-241235 and JP-A-9-236131, respectively, these techniques are not effective since the processing of the roller and the additional processing of the inner and outer rings raise the costs thereof.

The cylindrical roller bearing disclosed in JP-A-2002-181053 is configured in a manner that the flange surface is crowned or that the contact portion between the inner ring flange portion and the roller end face becomes a contact portion between the outer diameter surface (inner ring flange surface) of a cone having a point as an apex and the spherical surface (the end face of the roller). However, the direction of the major axis of the contact ellipse caused at the contact portion between the roller and the flange portion is the radial direction of the inner ring of the bearing. Thus, there arises a problem that the contact ellipse may protrude from the relief groove of the inner ring flange surfaced or the outer diameter of the flange surface depending on an amount of the axial load, so that an edge load is generated at the boundary surface between the contact ellipse and the relief groove or the boundary surface between the contact ellipse and the outer diameter portion of the flange portion.

Further, in order to prevent the contact ellipse from protruding from the relief groove of the flange surface, it is considered to raise the center position of the contact ellipse which is the contact surface between the roller and the flange portion on the outer diameter side of the flange surface. However, in this case, since the slippery degree between the roller and the flange portion becomes large, a heat value increases, whereby there arises such problems that the temperature of the bearing increases, scoring or seizure etc. of the flange portion occurs.

In order to solve the aforesaid problems, an object of the invention is to provide a cylindrical roller bearing which can improve a seizure property and improve an allowable rotation speed without increasing the size of a bearing.

DISCLOSURE OF THE INVENTION

The aforesaid object of the invention is attained by the following configurations.

(1) A cylindrical roller bearing comprising an inner ring having an inner ring raceway surface, an outer ring having an outer ring raceway surface and cylindrical rollers each disposed between the inner ring raceway surface and the outer ring raceway surface, wherein at least one of the inner ring and the outer ring has a flange portion provided with a roller guide-surface which contacts with and guides end faces of the cylindrical rollers, the cylindrical roller bearing is characterized in that supposing that a diameter of the cylindrical roller is Da, the end face of the cylindrical roller away from a center axis of the cylindrical roller by 0.40 Da in a radial direction is set as a first position, and the end face of the cylindrical roller away from the center axis of the cylindrical roller by 0.35 Da in the radial direction is set as a second position, the end face of the cylindrical roller contacts with the roller guide-surface of the flange portion between the first position and the second position, the end face of the cylindrical roller has a convex-shaped crowning portion formed by a continuous curve which passes the first position and the second position, and an angle $\alpha$ formed between a straight line connecting the first position and the second position and a straight line perpendicular to the center axis of the cylindrical roller is set to be 0.5° or less.

(2) The cylindrical roller bearing described in (1) is characterized in that the angle $\alpha$ satisfies a relation of $\alpha < \theta$ with respect to an open angle $\theta$ of the roller guide-surface, and a surface roughness of at least the crowning portion at the end face of the cylindrical roller is set in a range of 0.02 to 0.15 μmRa. Note that the surface roughness Ra is arithmetical surface roughness which defined as JIS B 0601-1994.

(3) A cylindrical roller bearing comprising an inner ring having an inner ring raceway surface, an outer ring having an outer ring raceway surface and cylindrical rollers each disposed between the inner ring raceway surface and the outer ring raceway surface, wherein at least one of the inner ring and the outer ring has a flange portion provided with a roller guide-surface which contacts with and guides end faces of the cylindrical rollers, the cylindrical roller bearing is characterized in that the end face of the cylindrical roller has a convex-shaped crowning portion which contacts with the roller guide-surface when a load of a predetermined value or more acts, and a radial direction distance h between the rolling surface of the cylindrical roller and a cross point where the end face of the cylindrical roller contacts with a phantom line along the roller guide-surface in a state where no load acts satisfies a relation of $h=Da/2-R' \times \sin(\theta)$ and 0.05 (mm)$\leq h \leq$0.5 (mm), wherein Da represents a diameter of the cylindrical roller, $\theta$ represents a flange open angle of the roller guide-surface, and R' represents a curvature radius of the crowning portion.

(4) A cylindrical roller bearing described in (3) is characterized in that the a ratio between the radial direction distance h and a flange height L of the flange portion satisfies a relation of $0.01 \leq h/L \leq 0.13$, and the cross point faces on a relief groove formed in at least one of the inner ring raceway surface and the outer ring raceway surface.

According to the cylindrical roller bearing described in (1), since the end face of the roller contacting with the roller guide-surface of the flange portion is configured in the aforesaid manner, a contact surface pressure at the contact portion between the roller guide-surface of the flange portion and the end face of the roller at the time of loading an axial load on the cylindrical roller bearing can be made small. As a result, a PV value (a product of the contact surface pressure P and a slip velocity V) of the contact portion can be reduced and the seizure resistance can be improved. Thus, according to the aforesaid configuration, the seizure resistance can be improved and an allowable rotation speed can also be improved without increasing the size of the bearing.

Incidentally, in the cylindrical roller bearing for an automobile, if the outer diameter of the cylindrical roller is 25 mm or less, the surface roughness of 0.15 μmRa or less can be satisfied by subjecting the raceway surface and the end face of the cylindrical roller to the relieved end grinding.

Further, according to the cylindrical roller bearing described in (3), the radial direction distance at the cross point based on the configuration of the end face of the roller and the configuration of the roller guide-surface of the flange portion are set in the aforesaid range. Thus, even when an axial load of a predetermined value or more is loaded on the cylindrical roller bearing and so the contact portion shifts towards the peripheral surface of the flange portion due to the influence of the tilt, the contact portion is prevented from protruding from the roller guide-surface. Further, the contact surface pressure at the contact portion between the roller guide-surface of the flange portion and the end face of the roller can be made small. As a result, the PV value (a product of the contact surface pressure P and a slip velocity V) of the contact portion can be reduced and the seizure resistance can be improved. Thus, according to the aforesaid configuration, the seizure resistance can be improved and the allowable rotation speed can also be improved without increasing the size of the bearing.

Figure 1:
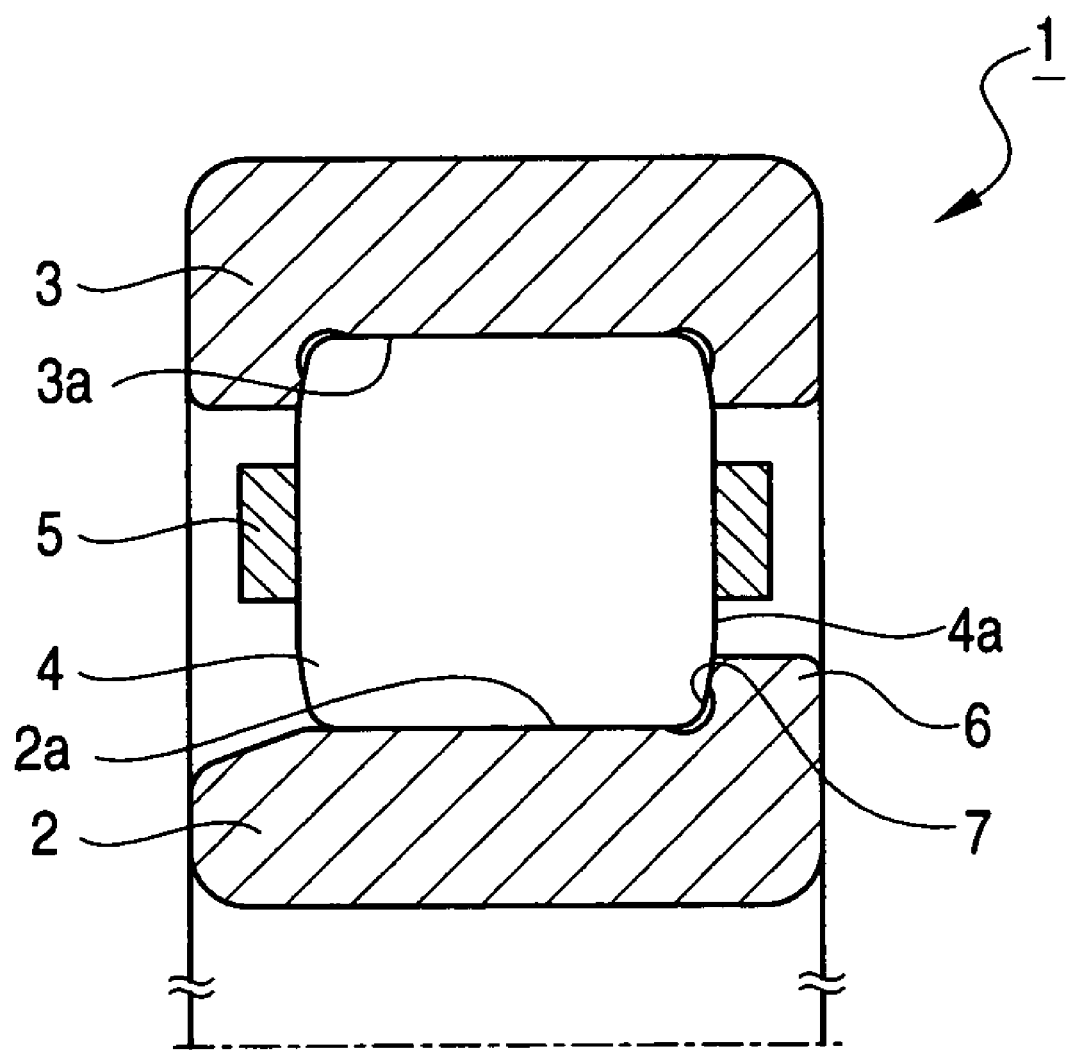
FIG. 1 is a sectional diagram showing a part of the cylindrical roller bearing according to the first embodiment of the present invention.

In the drawings, reference numerals 1 and 21 depict cylindrical roller bearings, 2 and 22 inner rings, 3 and 23 outer rings, 4 and 24 cylindrical rollers, 5 a retainer, 6 and 25 flange portions, 7 and 27 roller guide-surfaces, 10 and 26 flange rings and 28 a relief groove.

BEST MODE FOR CARRYING OUT THE INVENTION

Embodiments of the cylindrical roller bearing according to the invention will be explained with reference to the accompanying drawings.

First Embodiment

Figure 2:
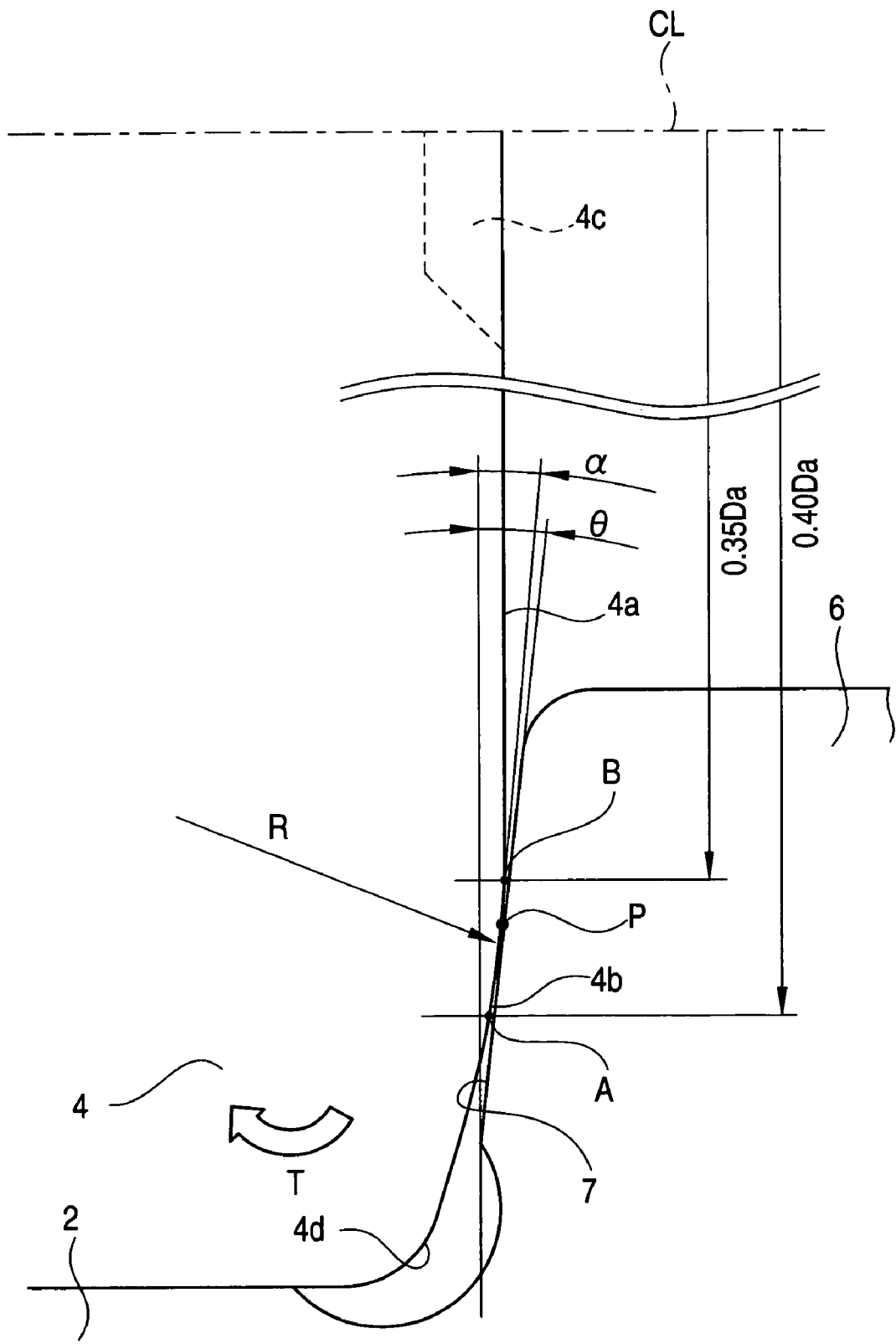
FIG. 2 is an enlarged diagram of a main part showing a portion where the roller guide-surface of a flange portion contacts with the end face of a cylindrical roller.

First, the cylindrical roller bearing according to the first embodiment of the invention will be explained. FIG. 1 is a sectional diagram showing a part of the cylindrical roller bearing according to the first embodiment. FIG. 2 is an enlarged diagram of a main part showing a portion where the roller guide-surface of a flange portion contacts with the end face of the cylindrical roller.

As shown in FIG. 1, the cylindrical roller bearing 1 includes an inner ring 2, an outer ring 3, cylindrical rollers 4 and a retainer 5. The inner ring 2 includes an inner ring raceway surface 2a at the center portion of the outer peripheral surface thereof. The outer ring 3 includes an outer ring raceway surface 3a at the center portion of the inner peripheral surface thereof. The cylindrical rollers 4 held with a predetermined interval along the circumferential direction by the retainer 5 are disposed so as to rotate freely between the inner ring raceway surface 2a and the outer ring raceway surface 3a.

A flange portion 6 for guiding the cylindrical rollers 4 in the circumferential direction of the inner ring 2 and the outer ring 3 is provided at each of the one end of the inner ring 2 and the both ends of the outer ring 3. The flange portion 6 is provided at the inner side surface thereof with a roller guide-surface 7 which contacts with and guides the end faces 4a of the cylindrical rollers 4. As shown in FIG. 2 (the figure shows the flange portion of the inner ring as an example), the roller guide-surface 7 is formed so as to be opened outside by a predetermined flange open angle $\theta$ with respect to the surface perpendicular to the axial direction of the cylindrical roller 4. The cylindrical roller 4 rolls on the inner ring raceway surface 2a while the end face 4a thereof slidably contacts with the roller guide-surface 7 of the flange portion 6.

Supposing that the diameter of the cylindrical roller 4 is Da, the end face 4a of the cylindrical roller 4 away from the center axis CL of the cylindrical roller 4 by 0.40 Da in the radial direction is set as a first position A, and the end face 4a of the cylindrical roller 4 away from the center axis CL of the cylindrical roller 4 by 0.35 Da in the radial direction is set as a second position B, the end face 4a of the cylindrical roller 4 is formed so as to contact with the roller guide-surface 7 of the flange portion 6 between the first position A and the second position B.

The end face 4a of the cylindrical roller 4 is provided with a convex-shaped crowning portion 4b which is formed by a continuous curve of a curvature radius R passing two points of the first position A and the second position B. In the crowning portion 4b, an inclined angle $\alpha$ formed between a straight line connecting the first position A and the second position B and a straight line perpendicular to the center axis CL of the cylindrical roller is set to be 0.5° or less as shown by the following formula.

$$\alpha = \operatorname{Tan}^{-1}\{(\text{a drop amount of the roller at the first position } A - \text{a drop amount of the roller at the second position } B)/0.05\,Da\} \leq 0.5°.$$

The crowning portion 4b of the end face 4a thus formed is given by the relieved end grinding using an elastic grinding stone with the Young's modulus in a range of 10 to 500 MPa. The surface roughness of at least the crowning portion 4b at the end face 4a of the cylindrical roller 4 is set in a range of 0.02 to 0.15 μmRa. The end face 4a of the cylindrical roller is provided with a circular recess portion 4c at the center portion thereof and a chamfer portion 4d at a portion adjacent to the rolling surface.

According to the embodiment, since a region between the first position A and the second position B on the end face 4a of the cylindrical roller 4 is set as a contact region where the roller guide-surface 7 of the flange portion 6 contacts with the end face 4a of the cylindrical roller 4, the contact region opposes to almost the center portion in the thickness direction of the flange portion and so is located at the optimum position for pivotally supporting an axial withstand load.

The crowning portion 4b of the end face 4a of the cylindrical roller 4 is configured so as to be formed by the continuous curve which passes the two points of the first and second positions A and B and have the inclined angle $\alpha$ of 0.5° or less, whereby the contact surface pressure at the contact region in the case of acting an axial load thereon can be reduced and a PV value can be reduced. In this embodiment, the inclined angle $\alpha$ at the contact region of the end face 4a of the cylindrical roller 4 is set to be smaller as compared with the flange open angle $\theta$ of the roller guide-surface 7 so that the contact surface pressure is adjusted to be reduced depending on the relation between the inclined angle $\alpha$ and the flange open angle $\theta$.

Further, according to the embodiment, a crowing portion is not provided at the entirety of the end face of the roller unlike the conventional technique, but only the region between the first position A and the second position B on the end face 4a of the cylindrical roller 4 is formed by the continuous curve, so that the processing time can be made short and the cost can be reduced. Furthermore, since only such the region is processed, the roughness thereof can be made good and the seizure resistance can be improved. The crowning portion 4b may be formed only at the region at least between the first position A and the second position B, or may be formed so as to extend to both sides from the region between the two points A and B.

Figure 3:
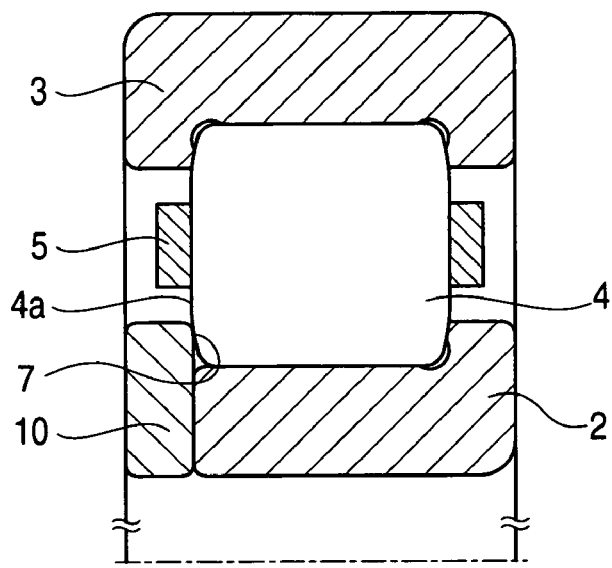
FIG. 3 is a sectional diagram showing a part of the cylindrical roller bearing according to the modified example of the first embodiment.

In this embodiment, although the explanation is made as to the flange portion on the inner ringside, the flange portion on the outer ring side can be configured in the same manner. Further, the flange portion is not limited to one which is directly formed in a flange-shape with respect to each of the inner and outer rings, but the flange portion may be one which is formed by a flange ring provided separately from the raceway ring. Furthermore, the flange portion may be a double flange type or a single flange type. That is, if an axial load is applied to only one direction at the time of usage, the flange portion may be provided only at one end portion side to which the axial load acts. For example, as shown in FIG. 3, a flange ring 10 formed separately from the tack ring may be provided at the inner ring 2, and the roller guide-surface 7 of the flange ring 10 and the end face 4a of the cylindrical roller 4 may be configured in the aforesaid manner.

The contact region includes one in a case where at least the center of the contact ellipse caused when the cylindrical roller 4 contacts with the flange portion 6 locates between the first position A and the second position B.

(Test 1)

Next, a rotation efficiency test was made by using the cylindrical roller bearings 1 of the first embodiment in which the cylindrical rollers 4 had different end face shapes, respectively. Incidentally, each of the cylindrical roller bearings 1 employed in embodiments 1 to 3 and comparative examples 1, 2 had an inner diameter of 45 mm, an outer diameter of 75 mm and a width of 20 mm. Each of the cylindrical rollers 4 had a diameter Da of 7.5 mm and a length of 13 mm. The numbers of the rollers was 18. A retainer made of iron was used as the retainer 5. The flange open angle θ of the flange portion 6 provided at each of the inner ring 2 and the outer ring 3 was set to be 0.5°.

The surface roughness of each of the inner ring raceway surface 2a, the outer ring raceway surface 3a and the roller guide-surface 7 of the flange portion 6 was set to a range of 0.05 to 0.20 μmRa. The surface roughness of the rolling surface of each of the cylindrical rollers 4 of the respective embodiments and the respective comparative examples was set to 0.15 μmRa. Further, the surface roughnesses of the end faces 4a of the cylindrical rollers 4 of the respective embodiments and the respective comparative examples were set to values shown in a table 1 due to the grinding process using the elastic grinding stone with the Young's modulus in a range of 10 to 500 MPa.

able rotation speeds could be improved since the crowning portion 4b formed by the continuous curve was provided between the first position A and the second position B in the contact region and the inclined angle α of the straight line connecting the first position A and the second position B was set to be 0.5° or less which was smaller than the flange open angle θ.

This is because, in the actual usage, since there exists a bearing clearance between the flange portion 6 and the end face 4a of the cylindrical roller 4, the roller changes or inclines its posture due to the influence of a tilt T and so the contact position between the roller guide-surface 7 of the flange portion 6 and the end face 4a of the cylindrical roller 4 moves elevationally. However, in each of the embodiments 1 to 3, since the crowning portion 4b configured in the aforesaid

TABLE 1

| | Average drop amount at 0.40Da (3 mm) from center axis of roller | Average drop amount at 0.35Da (2.625 mm) from center axis of roller | Inclined angle α (°) at roller end face | Surface roughness of roller end face (μmRa) | Remarks |
|---|---|---|---|---|---|
| Embodiment 1 | 5 μm | 1.8 μm | 0.49 | 0.15 | |
| Embodiment 2 | 4 μm | 1.9 μm | 0.32 | 0.05 | |
| Embodiment 3 | 2.5 μm | 1.5 μm | 0.27 | 0.1 | |
| Comparative example 1 | — | — | 0 | 0.2 | No crowning at end face |
| Comparative example 2 | 10 μm | 6 μm | 0.61 | 0.1 | |

Figure 4:
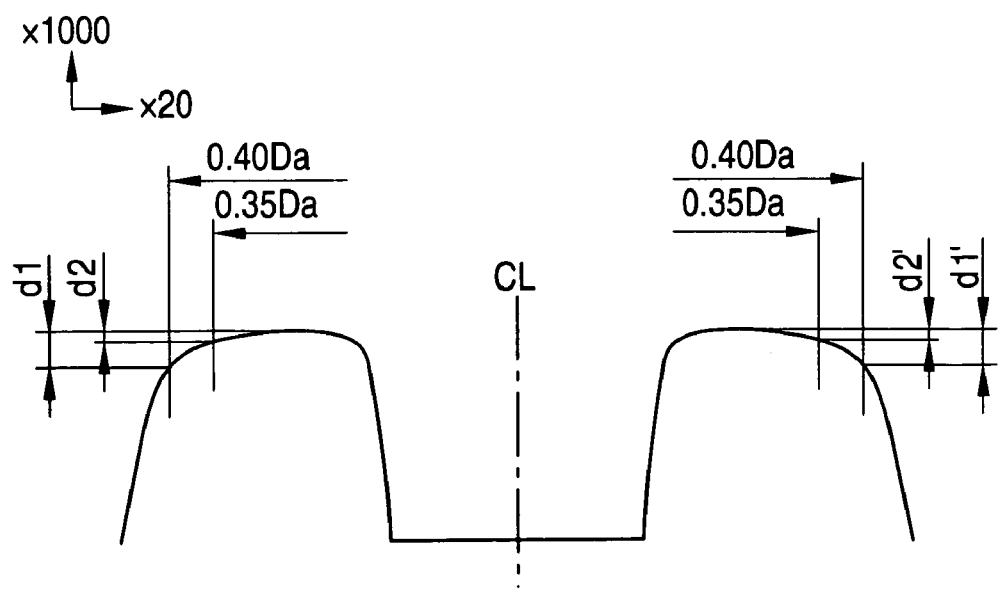
FIG. 4 is a schematic diagram showing the shape of the end face of the roller measured by a shape measurement equipment.

As to the end face configurations of the cylindrical rollers 4 of the respective embodiments and the respective comparative examples, the continuity and the drop amounts thereof can be recognized at the respective positions as shown in FIG. 4 by setting the longitudinal magnification and the vertical magnification thereof to about 1000 and about 20, respectively, by using a shape measurement equipment of a longitudinal type, for example.

The roller drop amount at the first position A, that is, a position away from the roller center axis in the radial direction by 0.40 Da (a position away from the roller center by 3 mm) can be given by calculating the average value of roller drop amounts d1, d1' at two positions obtained from FIG. 4. Further, the roller drop amount at the second position B, that is, a position away from the roller center axis in the radial direction by 0.35 Da (a position away from the roller center by 2.625 mm) can be given by calculating the average value of roller drop amounts d2, d2' at two positions obtained from FIG. 4.

The table 1 shows the average roller drop amounts at the first position A and the second position B and the inclined angles α given by the average roller drop amounts of the two positions A and B in the respective embodiments and the respective comparative examples. The comparative example 1 is a case where the end face of the cylinder roller was not subjected to the crowing processing.

A rotation evaluation test of the respective cylindrical roller bearings was performed under the following condition.

Figure 5:
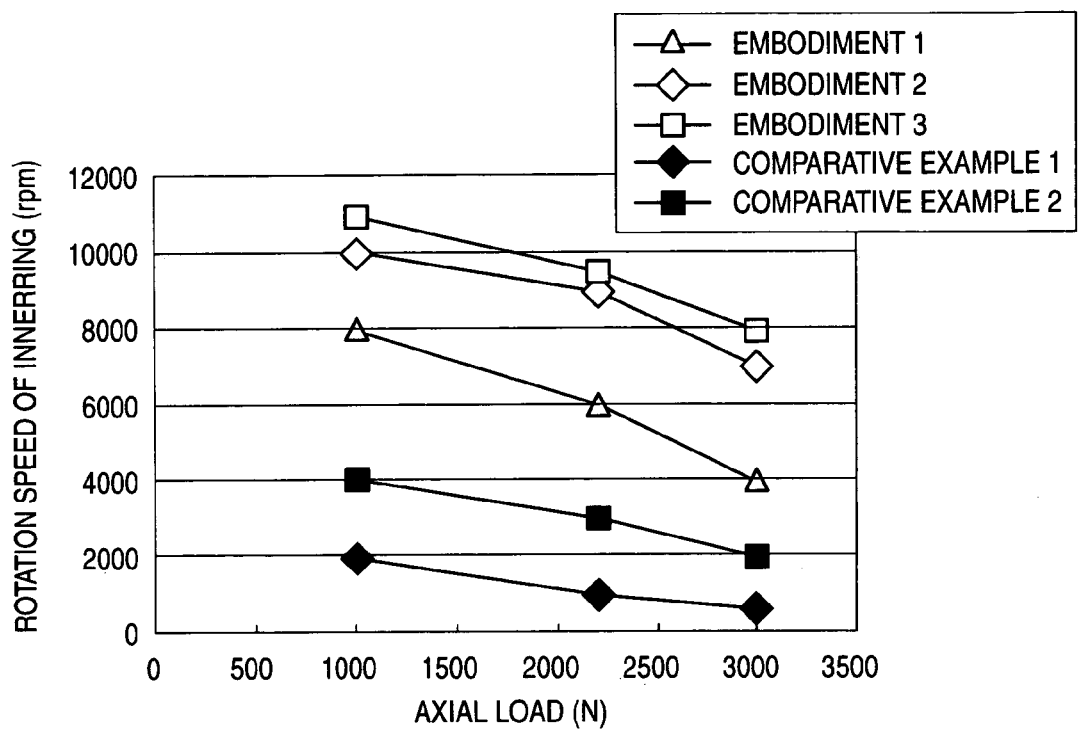
FIG. 5 is a diagram showing the relation between axial loads and inner ring allowable rotation speeds in the test of the first embodiment.

(Test Condition)
Bearing load Fr: 4,500 N (C=45,000N, P/C=0.1) Fa: 1,000 to 3,000 N
Rotation speed N: 4,000 rpm or more
Supplied oil amount 100 cc/min FIG. 5 shows the results of the rotation evaluation test in the respective embodiments and the respective comparative examples. As shown in the test results, the embodiments 1 to 3 could obtain sufficient allowable rotation speeds as compared with the comparative examples 1, 2. That is, the allowmanner is provided at the contact region of the end face 4a of the cylindrical roller 4, a larger contact surface can be obtained as compared with the comparative examples 1, 2. As a result, in each of the embodiments 1 to 3, the contact surface pressure can be made smaller as compared with the comparative examples 1, 2.

Further, since the surface roughness of the end face 4a including at least the crowning portion 4b was set in a range of 0.02 to 0.15 μmRa, it became possible to reduce the friction coefficient between the roller guide-surface 7 of the flange portion 6 and the end face 4a of the cylindrical roller 4, and further the oil film forming property was improved and the allowable rotation speed was increased. In particular, according to the embodiment 2, since the surface roughness of the end face 4a was set to 0.05 μmRa, it became possible to reduce a heat value generated between the flange portion 6 and the end face 4a of the cylindrical roller 4 and so the allowable rotation speed was increased.

On the other hand, in the comparative example 1, since the end face 4a of the cylindrical roller 4 was not subjected to the crowing processing, seizure abrasion was caused at the flange portion 6 of the inner ring 2 at 2,000 rpm in the case of Fa=1,000 N and at 500 rpm in the case of Fa=3,000 N. The reason of the occurrence of the seizure abrasion is considered that the surface pressure increased at the flange portion 6 to cause the seizure since the end face 4a of the cylindrical roller 4 was not subjected to the crowing processing.

In the comparative example 2, although the end face 4a of the cylindrical roller 4 was subjected to the crowing processing, since the roller guide-surface contacted with the end face 4a at the outer side of almost the center portion of the flange portion 6, the sliding velocity was large and the contact area was small, whereby seizure occurred due to the local contact.

Thus, according to the cylindrical roller bearing of the first embodiment, supposing that the diameter of the cylindrical roller 4 is Da, the end face 4a of the cylindrical roller away from the center axis of the cylindrical roller by 0.40 Da in the radial direction is set as the first position A, and the end face 4a of the cylindrical roller away from the center axis of the cylindrical roller by 0.35 Da in the radial direction is set as the second position B, the cylindrical roller bearing is configured in a manner that the end face 4a of the cylindrical roller contacts with the roller guide-surface 7 of the flange portion between the first position A and the second position B, the end face 4a of the cylindrical roller has the convex-shaped crowning portion 4b formed by the continuous curve passing the first position A and the second position B, and the angle α formed between the straight line connecting the first position A and the second position B and the straight line perpendicular to the center axis of the cylindrical roller is set to be 0.5° or less. Accordingly, when an axial load is loaded on the cylindrical roller bearing, the contact surface pressure of the contact portion between the roller guide-surface of the flange portion and the end face of the roller can be reduced and the PV value (a product of the bearing surface pressure P and the slip velocity V) can be reduced, whereby the seizure can be prevented from occurring. Thus, according to the aforesaid configuration, without increasing the size of the bearing, the seizure resistance can be improved and the allowable rotation speed can be improved.

Second Embodiment

Figure 6:
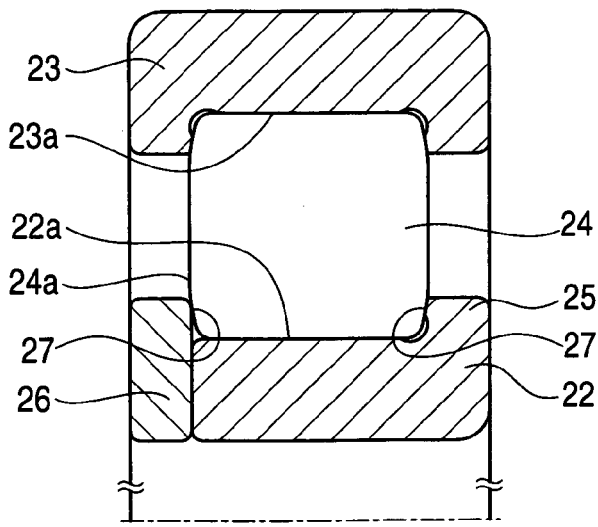
FIG. 6 is a sectional diagram showing a part of the cylindrical roller bearing according to the second embodiment of the present invention.
Figure 7:
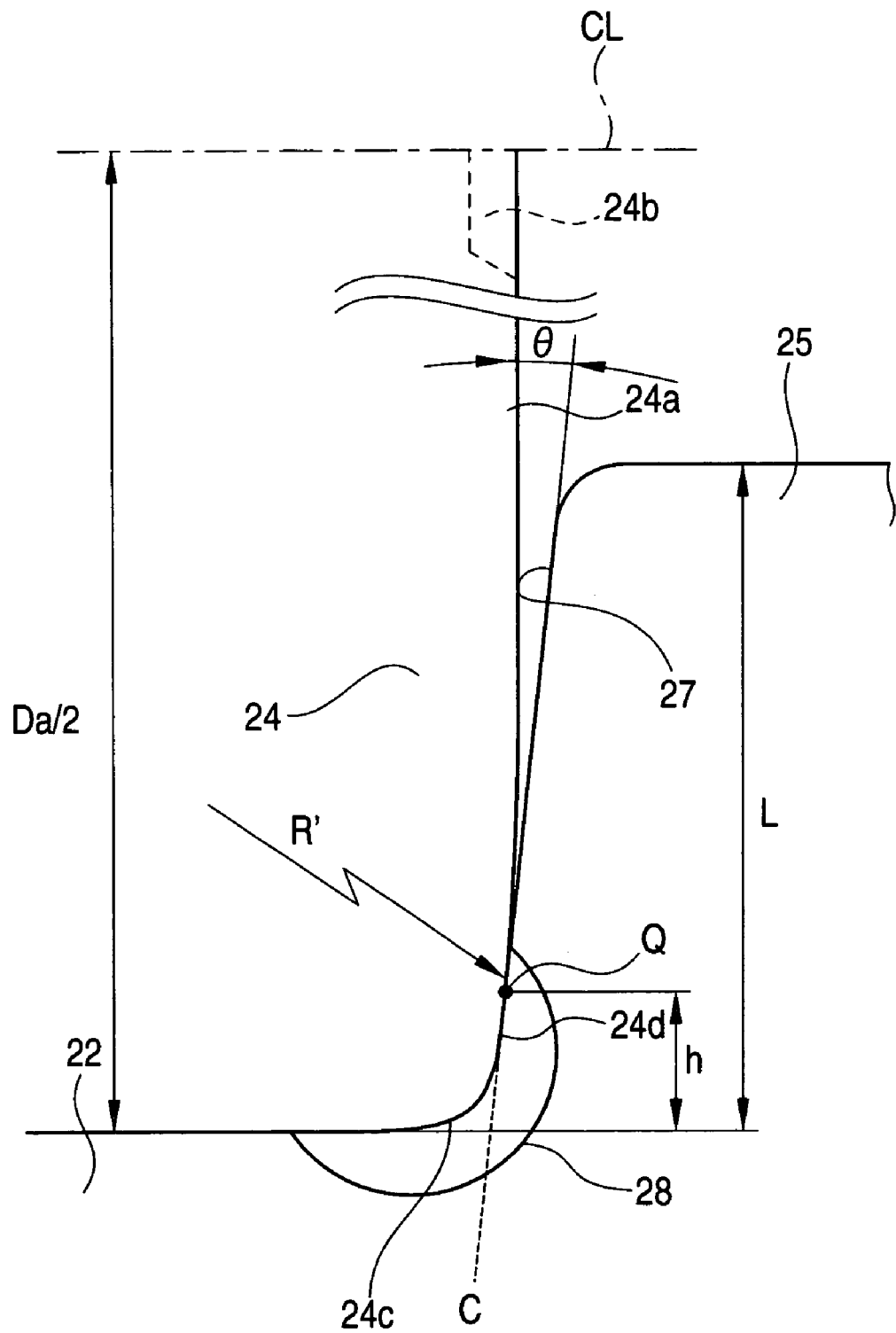
FIG. 7 is an enlarged diagram of a main part showing the roller guide-surface of a flange portion and the end face of a cylindrical roller in a state where no load acts in the cylindrical roller bearing of FIG. 6.
Figure 8:
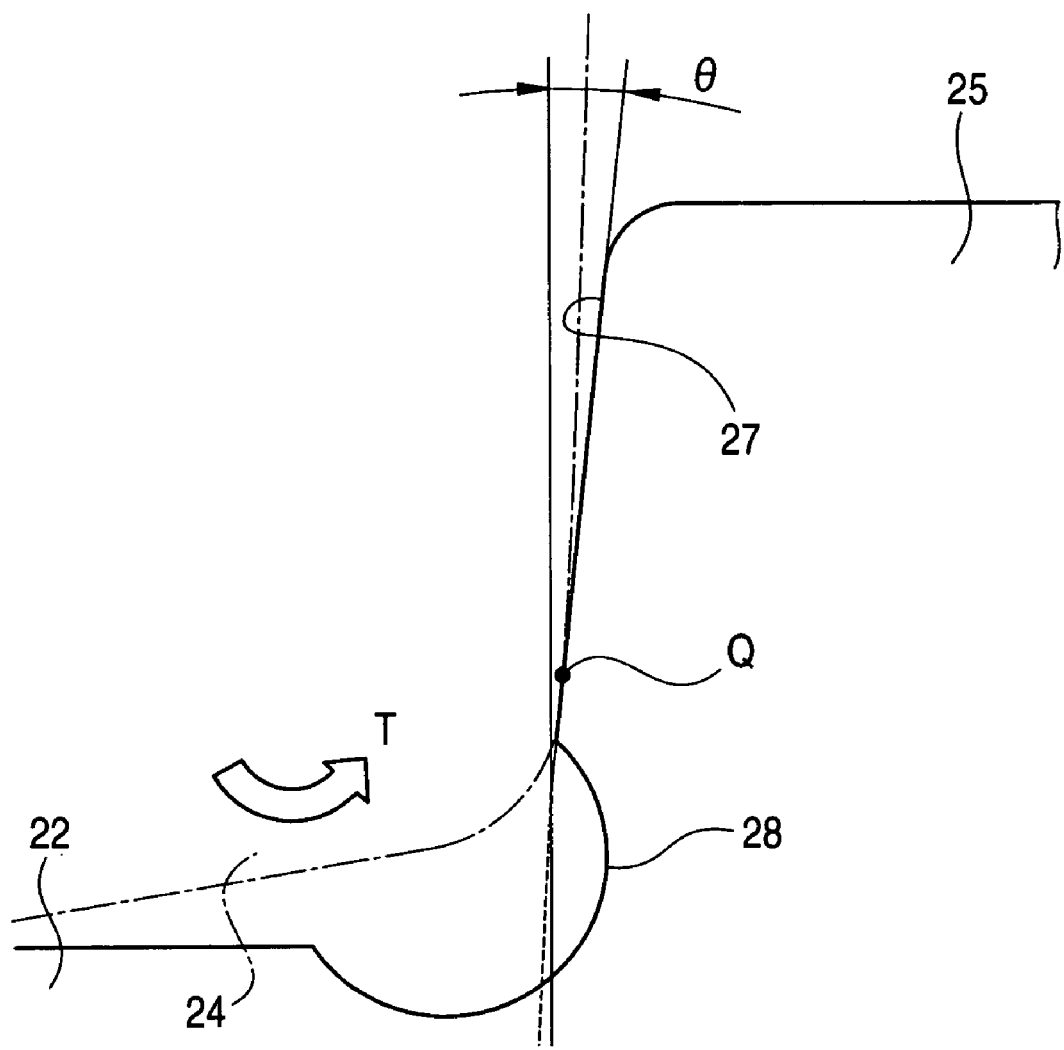
FIG. 8 is an enlarged diagram of a main part showing the roller guide-surface of the flange portion and the end face of the cylindrical roller in a state where a load acts in the cylindrical roller bearing of FIG. 6.

Next, the cylindrical roller bearing according to the second embodiment of the invention will be explained. FIG. 6 is a sectional diagram showing a part of the cylindrical roller bearing according to this embodiment. FIG. 7 is an enlarged diagram of a main part showing the roller guide-surface of the flange portion and the end face of the cylindrical roller in a state where no load is acting in the cylindrical roller bearing of FIG. 6. FIG. 8 is an enlarged diagram of a main part showing the roller guide-surface of the flange portion and the end face of the cylindrical roller in a state where a load is acting in the cylindrical roller bearing of FIG. 6.

The cylindrical roller bearing shown in FIG. 6 is a cylindrical roller bearing for a manual transmission for a truck to which a large axial load together with a radial load is applied. The cylindrical roller bearing 21 includes an inner ring 22, an outer ring 23 and cylindrical rollers 24. The inner ring 22 includes, at the outer peripheral surface thereof, an inner ring raceway surface 22a extending from one end thereof along the axial direction. The outer ring 23 includes an outer ring raceway surface 23a at the center portion of the inner peripheral surface thereof. Cylindrical rollers 24 are disposed so as to rotate freely between the inner ring raceway surface 22a and the outer ring raceway surface 23a.

A flange portion 25 for guiding the cylindrical rollers 24 in the circumferential direction of the inner ring 22 and the outer ring 23 is provided at each of the other end of the inner ring 22 and the both ends of the outer ring 23. An annual flange ring 26 having an outer diameter larger than that of the inner ring raceway surface 22a is abutted against the one end surface of the inner ring 22. Each of the flange portion 25 and the flange ring 26 is provided at the inner surface thereof with a roller guide-surface 27 which has a flange height L from the outer ring raceway surface or the inner ring raceway surface to the peripheral surface thereof and contacts with and guides the end face 24a of the cylindrical roller 24. As shown in FIG. 7 (the figure shows the flange portion of the inner ring as an example), the roller guide-surface 27 is formed so as to be opened outside by a predetermined flange open angle θ with respect to the surface perpendicular to the axial direction of the cylindrical roller 24. The cylindrical roller 24 rolls on the inner ring raceway surface 22a while the end face 24a thereof slidably contacts with the roller guide-surface 27 of the flange portion 25.

The end face 24a of the cylindrical roller 24 is provided at the center portion thereof with a circular recess portion 24b and also provided at a portion adjacent to the rolling surface with a chamfer portion 24c. The end face 24a of the cylindrical roller 24 is provided at the outside (the upper side in FIG. 7) of the radial direction of the chamfer portion 24c with a convex-shaped crowning portion 24d formed by a continuous curve with a curvature radius R'.

Supposing that a cross point where the crowning portion 24d contacts with a phantom line C along the roller guide-surface 27 is Q in a state where none of a radial load and an axial load act, a radial direction distance h between the cross point Q and the rolling surface of the cylindrical roller 24 (or the inner ring raceway surface 22a) satisfies the following formula geometrically.

$$h = Da/2 - R' \times \sin(\theta) \quad (1)$$

where Da represents the diameter of the cylindrical roller.

When the cylindrical roller bearing 21 is used, there generally exists a radial clearance in a range of about 10 to 50 μm. Thus, as shown in FIG. 8, when a radial load of a predetermined value or more acts, due to the influence of a tilt T by which the cylindrical roller 24 inclines in the width direction, the cross point Q shifts on the upper side of the radial direction and so becomes a contact point Q at which the end face of the cylindrical roller actually contacts with the roller guide-surface 27. Thus, the position of the cross point Q in a state where no load acts is set on the lower side of the flange portion 25 in advance so that the end face 24a of the cylindrical roller 24 actually contacts with almost center position of the roller guide-surface 27 or the lower side from the center position thereof when a large axial load acts. To be concrete, the radial direction distance h of the cross point Q is set in the following manner.

$$0.05 \text{ (mm)} \leq h \leq 0.5 \text{ (mm)} \quad (2)$$

That is, the conventional technique is designed in a manner that the contact point between the end face 24a of the cylindrical roller 24 and the roller guide-surface 27 in a state where no load acts is set at almost the center portion of a flange height L, and a contact ellipse which becomes large when an axial load becomes large is received at the center portion of the flange height L. However, in fact, the contact ellipse protrudes outside of the flange height L and so a PV value becomes large, whereby the seizure likely occurs.

Thus, according to the cylindrical roller bearing 21 with a large axial load resistance according to this embodiment, the curvature radius R' of the crowning portion 24d is set large with respect to the conventional relation between the curvature radius R' of the crowning portion 24d of the end face and the flange portion 25 and then a calculation is made in view of the influence of the tilt and a skew. Thus, the cylindrical roller bearing is configured in a manner that the contact point Q is set on the lower side (the relief groove 28 of the inner ring raceway surface 22a) of the flange portion when an axial load is small and the contact point Q shifts around the center of the flange height L when an actual axial load (for example, 1 ton or more) is applied.

In this embodiment, when the cross point Q is set so as to satisfy the formula (2) in the state where no load acts, the cross point Q faces within the relief groove 28 which is provided on the inner side (the lower side in FIG. 7) of the radial direction from the roller guide-surface 27. In this respect, in the configuration where the relief groove 28 is designed to be small and the roller guide-surface 27 protrudes to the inner side of the radial direction, the cross point Q may actually contact with the roller guide-surface 27 in a state where no load acts.

Further, in this embodiment, in view of the influence of the tilt at the time where an axial load of the predetermined value or more acts, a ratio between the radial direction distance h and the flange height L of the cross point Q in the state where no load acts is set in the following manner so that the cross point Q does not exceed the flange height L.

$$0.01 \text{ (mm)} \leq h/L \leq 0.13 \text{ (mm)} \quad (3)$$

Thus, in this embodiment, the cross point Q between the end face 24a of the cylindrical roller 24 and the phantom line C along the roller guide-surface 27 of the flange portion 25 in the state where no load acts is set on the lower side of the flange portion 25, that is, set so that the radial direction distance h of the cross point Q satisfies the formula (2). Thus, even when the tilt causes in the case where an excessive axial load of the predetermined value or more acts, the cross point Q generates the contact ellipse at almost the center of the flange height L or the lower side position from the center thereof and so actually contacts with the roller guide-surface 27. Thus, even when a high load acts, the PV value at the contact point can be reduced and so the seizure resistance can be improved.

In this embodiment, although the explanation is made as to the flange portion on the inner ring side, the flange portion on the outer ring side can be configured in the same manner. Further, this embodiment may be constituted by the configuration of a roller guide-surface formed at a flange ring provided separately from the raceway ring and the end face of the cylindrical roller. Furthermore, the flange portion may be a double flange type or a single flange type. That is, if an axial load is applied to only one direction at the time of usage, the flange portion may be provided only at one end portion side to which the axial load acts.

In the cylindrical roller bearing for an automobile like this embodiment, if the outer diameter of the cylindrical bearing is 25 mm or less, the seizure efficiency can be further improved by stetting the surface roughness of the raceway surface and the end face of the cylindrical roller to 0.15 μmRa or less by means of the grinding process and by setting the surface roughness of the end face of the roller and the contact surface of the flange surface to about 0.02 μmRa by the super finishing.

(Test 2)

Next, a rotation evaluation test was made by using the cylindrical roller bearings 21 of the second embodiment in which the cylindrical rollers 24 had different end face shapes and the flange portions had different roller guide-surface shapes. Incidentally, each of the cylindrical roller bearings 21 employed in embodiments 4 to 6 and comparative examples 3, 4 was JIS No. NUPK313 (a keystone type having an inner diameter of 65 mm, an outer diameter of 140 mm, a width of 33 mm, a roller diameter Da of 20 mm, a roller length 1 of 23 mm, the number of the rollers of 16 and having no retainer) The surface roughness of each of the inner ring raceway surface 22a, the outer ring raceway surface 23a and the roller guide-surface 27 of the flange portion 25 was set in a range of 0.05 to 0.20 μmRa by the relieved end grinding or the super finishing processing. Further, the surface roughness of the rolling surface of the cylindrical roller 24 in each of the embodiments and the comparative examples was set to the same value of 0.15 μmRa. A table 2 shows the flange open angles θ of the roller guide-surfaces 27 and the curvature radiuses R' at the crowning portions 24d of the end faces 24a of the cylindrical rollers 24.

TABLE 2

| | Curvature radius R' (mm) at crowing portion | Flange open angle θ (°) | Radius direction distance h (mm) at cross point Q | h/L | Remarks |
|---|---|---|---|---|---|
| Embodiment 4 | 1,810 | 0.3 | 0.5 | 0.13 | |
| Embodiment 5 | 1,140 | 0.5 | 0.05 | 0.01 | |
| Embodiment 6 | 800 | 0.7 | 0.2 | 0.05 | |
| Comparative example 3 | 1,500 | 0.3 | 2.1 | 0.53 | Aiming center of flange height |
| Comparative example 4 | 1,905 | 0.3 | 0.03 | 0.003 | |

The rotation evaluation test of the respective cylindrical roller bearings was performed under the following condition.

(Test Condition)
Bearing load Fr: 19,000 N (C=189,000 N, P/C=0.1) Fa: 25,000 N
Rotation speed N: 500 to 6,000 rpm (tested for ten minutes and increased at every 500 rpm)
Supplied oil amount 5 cc/min (transmission oil: 80W-90)

Incidentally, the number N of the test was 2, and the rotation speed at which the temperature of the bearing increased to 160° C. or more or at which the bearing vibration became five times as large as the initial vibration due to the abrasion or seizure was set as the allowable rotation speed.

Figure 9:
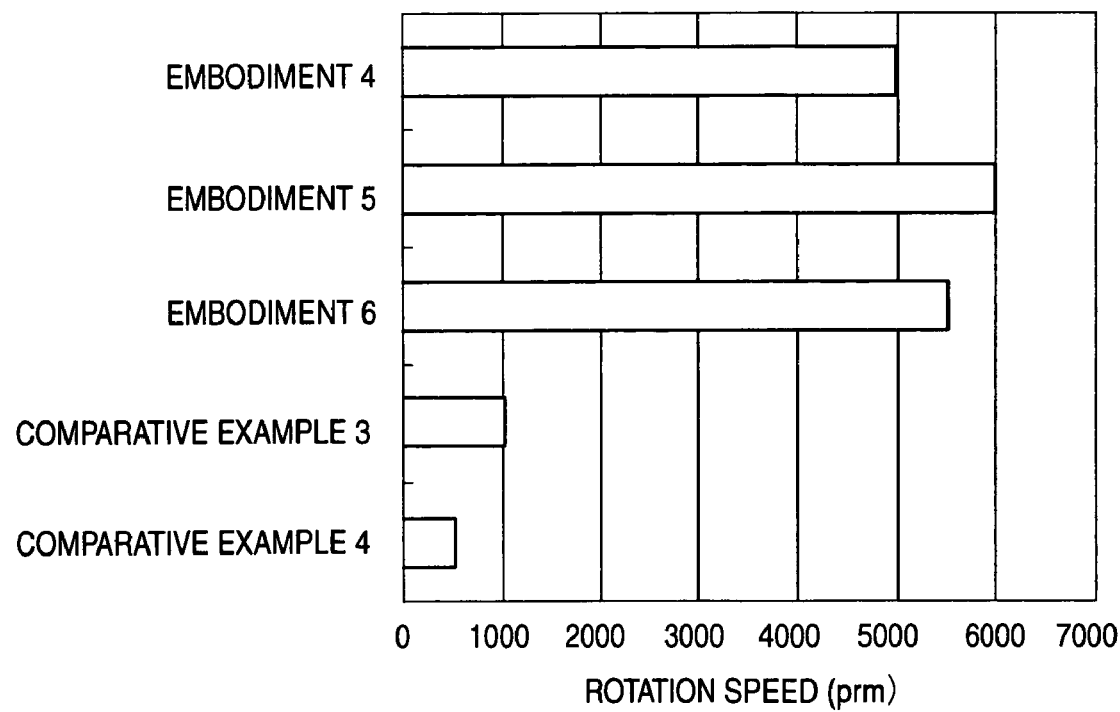
FIG. 9 is a diagram showing the result of the rotation evaluation test in the test of the second embodiment.

FIG. 9 shows the result of the rotation evaluation test in the respective embodiments and the respective comparative examples. As shown in the test results, it was admitted that the allowable rotation speeds in the embodiments 4 to 6 increased sufficiently as compared with the comparative examples 3, 4.

In the embodiment 4, the curvature radius R' of the crowning portion 24d was set to 1,810 mm and the flange open angle θ of the roller guide-surface 27 was set to 0.3°, and so the radial direction distance h of the cross point Q in a state where no load acted was 0.5 mm (h/L=0.13). In a state where a radial load and an axial load acted on the cylindrical roller bearing 21 thus configured, it was confirmed that the cross point Q caused a contact ellipse together with the roller guide-surface 27 due to the influence of the tilt T at the height of 2 mm from the inner ring raceway surface to actually contact with the roller guide-surface and so the end face 24a of the cylindrical roller 24 contacted with the roller guide-surface at almost the center position of the flange height L. Further, from the result of the rotation evaluation test shown in FIG. 9, it is understood that none of the seizure and the abrasion occurred until the rotation speed increased to 5,000 rpm (the seizure occurred when the rotation speed of 5,000 rpm continued 10 minutes).

In the embodiment 5, the curvature radius R' of the crowning portion 24d was set to 1,140 mm and the flange open angle θ of the roller guide-surface 27 was set to 0.5°, and so the radial direction distance h of the cross point Q in a state where no load acted was 0.05 mm (h/L=0.01). In the state where a radial load and an axial load acted on the cylindrical roller bearing 21 thus configured, it was confirmed that the cross point Q caused the contact ellipse together with the roller guide-surface 27 due to the influence of the tilt T at the height of 1.2 mm from the inner ring raceway surface to actually contact with the roller guide-surface and so the end face 24a of the cylindrical roller 24 contacted with the roller guide-surface at the lower side from the center position of the flange height L. Further, from the result of the rotation evaluation test shown in FIG. 9, it is understood that none of the seizure and the abrasion occurred until the rotation speed increased to 6,000 rpm (the seizure occurred when the rotation speed of 6,000 rpm continued 10 minutes).

Further, in the embodiment 6, the curvature radius R' of the crowning portion 24d was set to 800 mm and the flange open angle θ of the roller guide-surface 27 was set to be further inclined to 0.7°, and so the radial direction distance h of the contact point Q in 1 the state where no load acted was 0.2 mm (h/L=0.05). In the state where a radial load and an axial load acted on the cylindrical roller bearing thus configured, it was confirmed that the cross point Q caused the contact ellipse together with the roller guide-surface 27 due to the influence of the tilt T at the height of 1.6 mm from the inner ring raceway surface to actually contact with the roller guide-surface and so the end face 24a of the cylindrical roller 24 contacted with the roller guide-surface at almost the center position of the flange height L. Further, from the result of the rotation evaluation test shown in FIG. 9, it is understood that none of the seizure and the abrasion occurred until the rotation speed increased to 5,500 rpm (the seizure occurred when the rotation speed of 5,500 rpm continued 10 minutes).

On the other hand, the comparative example 3 was configured in a manner that the curvature radius R' of the crowning portion 24d was set to 1,500 mm and the flange open angle θ of the roller guide-surface 27 was set to 0.3°, and the radial direction distance h of the cross point Q in the state where no load acted was 2.1 mm (h/L=0.53). In other words, in the comparative example 3, the cross point Q in the state where no load acted was the contact point at which the cross point actually contacted with the roller guide-surface 27 and which was almost the center point of the flange height L. However, in the state where a radial load and an axial load acted, the cross point Q shifted to the height of 4 mm due to the influence of the tilt T, and so the cross point Q at the end face of the cylindrical roller protruded from the outer diameter side of the roller guide-surface according to the calculation. Thus, a peripheral velocity V became higher and so the seizure and the abrasion occurred when the rotation speed of 1,000 rpm continued for five minutes.

Further, the comparative example 4 was configured in a manner that the curvature radius R' of the crowning portion 24d was set to 1,905 mm and the flange open angle θ of the roller guide-surface 27 was set to 0.3°, and the radial direction distance h of the cross point Q in the state where no load acted was 0.01 mm (h/L=0.003). In other words, the comparative example 4 was specified in a manner that there was scarcely any crowing at the end face 24a, and so the end face 24a of the cylindrical roller 24 contacted with the edge at the relief groove 28. In this configuration, in the state where a radial load and an axial load acted, the cross point Q still positioned within the relief groove despite of the influence of the tilt T, and so the end face 24a contacted with the edge at the relief groove 28. Thus, the seizure and the abrasion occurred when the rotation speed of 500 rpm continued for a short time of four minutes.

Accordingly, as clear from this rotation endurance test, it was confirmed that when the radial direction distance h at the cross point Q where the end face 24a of the cylindrical roller 24 contacted with the phantom line C along the roller guide-surface 27 was designed so as to satisfy the formulas (2) and (3), the allowable rotation speed could be increased and the seizure efficiency could be improved.

Thus, the cylindrical roller bearing according to the second embodiment is configured in a manner that the end face 24a of the cylindrical roller 24 is provided with the convex-shaped crowning portion 24d which contacts with the roller guide-surface 27 in the case where a load of the predetermined value or more acts, and that the radial direction distance h between the rolling surface of the cylindrical roller 24 and the cross point where the end face 24a of the cylindrical roller 24 contacts with the phantom line C along the roller guide-surface 27 satisfies the relation of h=Da/2−R'×sin(θ) and 0.05 (mm)≦h≦0.5 (mm), wherein Da represents the diameter of the cylindrical roller 24, θ represents the flange open angle of the roller guide-surface 27, and R' represents the curvature radius of the crowning portion 24d. According to such a configuration, even when an axial load of the predetermined value or more is applied to the cylindrical roller bearing and the contact point shifts toward the periphery of the flange portion due to the influence of the tilt, the contact point is prevented from moving out of the roller guide-surface and the contact surface pressure at the contact portion between the roller guide-surface of the flange portion and the end face of the roller can be made small. As a result, the PV value (a product of the contact surface pressure P and the slip velocity V) of the contact portion can be reduced and the seizure resistance can be improved. Thus, according to the aforesaid configuration, the seizure resistance can be improved and the allowable rotation speed can also be improved without increasing the size of the bearing.

It should be understood by those skilled in the art that although the invention has been explained in detail with reference to the particular embodiments, various changes and modifications may be made without departing from the spirit and the scope of the invention.

Although the standard heat treatment of SUJ2 is performed in the aforesaid embodiments, the seizure resistance can be improved by subject the carburizing treatment and the carbonitriding treatment to the cylindrical roller and the inner and outer rings. Further, the seizure resistance can be further improved by using case-hardened steel as the material, setting the retained austenite amount in a range of 20 to 45% and setting the surface hardness Hv in a range of 700 to 850.

The retainer used in the embodiments may be a pressed retainer made of iron, a retainer made of plastics or a keystone type having no retainer etc., for example. Incidentally, although the test was made by using the cylindrical roller bearing of the keystone type having no retainer in the second embodiment, if a pressed retainer made of iron is used or if a retainer made of plastics is used in a high-speed rotation state, the frictional coefficients of the cylindrical roller and the retainer are reduced, whereby the seizure efficiency can be further improved.

The present application is based on Japanese Patent Application (JP 2003-168107) filed on Jun. 12, 2003 and Japanese Patent Application (JP 2003-291258) filed on Aug. 11, 2003, the content of which is hereby incorporated by reference into this application.

INDUSTRIAL APPLICABILITY

As described above, the invention is usable as the cylindrical roller bearing which can improve the seizure resistance and also improve the allowable rotation speed without increasing the size of the bearing.

The invention claimed is:

1. A cylindrical roller bearing comprising:
an inner ring having an inner ring raceway surface;
an outer ring having an outer ring raceway surface; and
pluralities of cylindrical rollers each disposed between the inner ring raceway surface and the outer ring raceway surface, wherein at least one of the inner ring and the outer ring has a flange portion provided with a roller guide-surface which contacts with and guides end faces of the cylindrical rollers, wherein the end face of the cylindrical roller contacts with the roller guide-surface of the flange portion between a first position and a second position, the first position corresponding to a position of the end face of the cylindrical roller away from a center axis of the cylindrical roller by a distance 0.40×Da where Da is a diameter of the cylindrical roller, and the second position corresponding to a position of the end face of the cylindrical roller away from the center axis of the cylindrical roller by a distance 0.35×Da wherein the end face of the cylindrical roller has a convex-shaped crowning portion formed by a continuous curve which passes the first position and the second position, and wherein an angle $\alpha$ formed between a straight line connecting the first position and the second position and a straight line perpendicular to the center axis of the cylindrical roller is set to be 0.5° or less.

2. The cylindrical roller bearing according to claim 1, characterized in that the angle $\alpha$ satisfies a relation of $\alpha < \theta$ with respect to an open angle $\theta$ of the roller guide-surface, and a surface roughness of at least the crowning portion at the end face of the cylindrical roller is set in a range of 0.02 to 0.15 µmRa.

3. The cylindrical roller bearing according to claim 1, wherein a chamfer portion is formed at a region next to a radial outer surface of the cylindrical roller.

4. The cylindrical roller bearing according to claim 1, wherein the end surface of the cylindrical roller comprises:
   the crowning portion;
   a chamfer portion located between the crowning portion and a radial outer surface of the cylindrical roller; and
   a flat portion located at inside diameter side relative to the crowing portion.

5. A cylindrical roller bearing comprising: an inner ring having an inner ring raceway surface; an outer ring having an outer ring raceway surface; and pluralities of cylindrical rollers each disposed between the inner ring raceway surface and the outer ring raceway surface, wherein at least one of the inner ring and the outer ring has a flange portion provided with a roller guide-surface which contacts with and guides end faces of the cylindrical rollers,
   the end face of the cylindrical roller has a convex-shaped crowning portion which contacts with the roller guide-surface when a load of a predetermined value or more acts, and
   a radial direction distance h between the rolling surface of the cylindrical roller and a cross point where the end face of the cylindrical roller contacts with a phantom line along the roller guide-surface in a state where no load acts satisfies a relation of $h = Da/2 - R' \times \sin(\theta)$ and 0.05 (mm)$\leq h \leq$0.5 (mm), wherein Da represents a diameter of the cylindrical roller, $\theta$ represents a flange open angle of the roller guide-surface, and R' represents a curvature radius of the crowning portion.

6. The cylindrical roller bearing according to claim 5, characterized in that the a ratio between the radial direction distance h and a flange height L of the flange portion satisfies a relation of $0.01 \leq h/L \leq 0.13$, and the cross point faces on a relief groove formed in at least one of the inner ring raceway surface and the outer ring raceway surface.

7. The cylindrical roller bearing according to claim 5, wherein a chamfer portion is formed at a region next to a radial outer surface of the cylindrical roller.

8. The cylindrical roller bearing according to claim 5, wherein the end surface of the cylindrical roller comprises:
   the crowning portion;
   a chamfer portion located between the crowning portion and a radial outer surface of the cylindrical roller; and
   a flat portion located at inside diameter side relative to the crowing portion.

* * * * *